United States Patent [19]

Lenhart

[11] Patent Number: 4,669,604
[45] Date of Patent: Jun. 2, 1987

[54] VACUUM SINGLE FILER

[75] Inventor: Ronald A. Lenhart, Lakewood, Colo.

[73] Assignee: Precision Metal Fabricators, Inc., Arvada, Colo.

[21] Appl. No.: 700,748

[22] Filed: Feb. 12, 1985

[51] Int. Cl.$^4$ ............................................. B65G 47/26
[52] U.S. Cl. .................................. 198/453; 198/452; 198/433
[58] Field of Search ............... 198/453, 452, 689, 438, 198/448, 454, 455, 433, 380; 406/38

[56] References Cited

U.S. PATENT DOCUMENTS

| | | | |
|---|---|---|---|
| 3,352,404 | 11/1967 | Settembrini | 198/689 |
| 3,592,329 | 7/1971 | Fleischaoer | |
| 3,889,801 | 6/1975 | Boyer | 198/689 |
| 4,323,149 | 4/1982 | Pavone | 198/689 |
| 4,544,059 | 10/1985 | Mernoe | 198/453 |

FOREIGN PATENT DOCUMENTS

| | | | |
|---|---|---|---|
| 2411317 | 10/1974 | Fed. Rep. of Germany | 198/455 |
| 2505333 | 8/1975 | Fed. Rep. of Germany | 198/453 |
| 3001652 | 7/1981 | Fed. Rep. of Germany | 198/844 |

Primary Examiner—Joseph E. Valenza
Assistant Examiner—Kyle E. Shane
Attorney, Agent, or Firm—Fields, Lewis, Pittenger & Rost

[57] ABSTRACT

A vacuum single filer is provided for brining multiple rows of containers into single file at high speeds and over a relatively short distance. This is accomplished by discharging the containers in diagonal rows of three from a slotted dead plate onto a perforated conveyor belt extending over vacuum plenum chambers having slots therein for drawing a vacuum. The slot or slots aligned with the outermost container in each diagonal row draws sufficient vacuum to hold the outer container in fixed position and a deflector is used to direct the other containers into alignment behind the outer container and to slide them laterally across the belt as the belt moves them downstream until they are finally brought into single file alignment. An infeed vacuum conveyor cooperates with the slotted dead plate to arrange the containers in diagonal rows having a precise alignment prior to being picked up by the conveyor belt.

23 Claims, 9 Drawing Figures

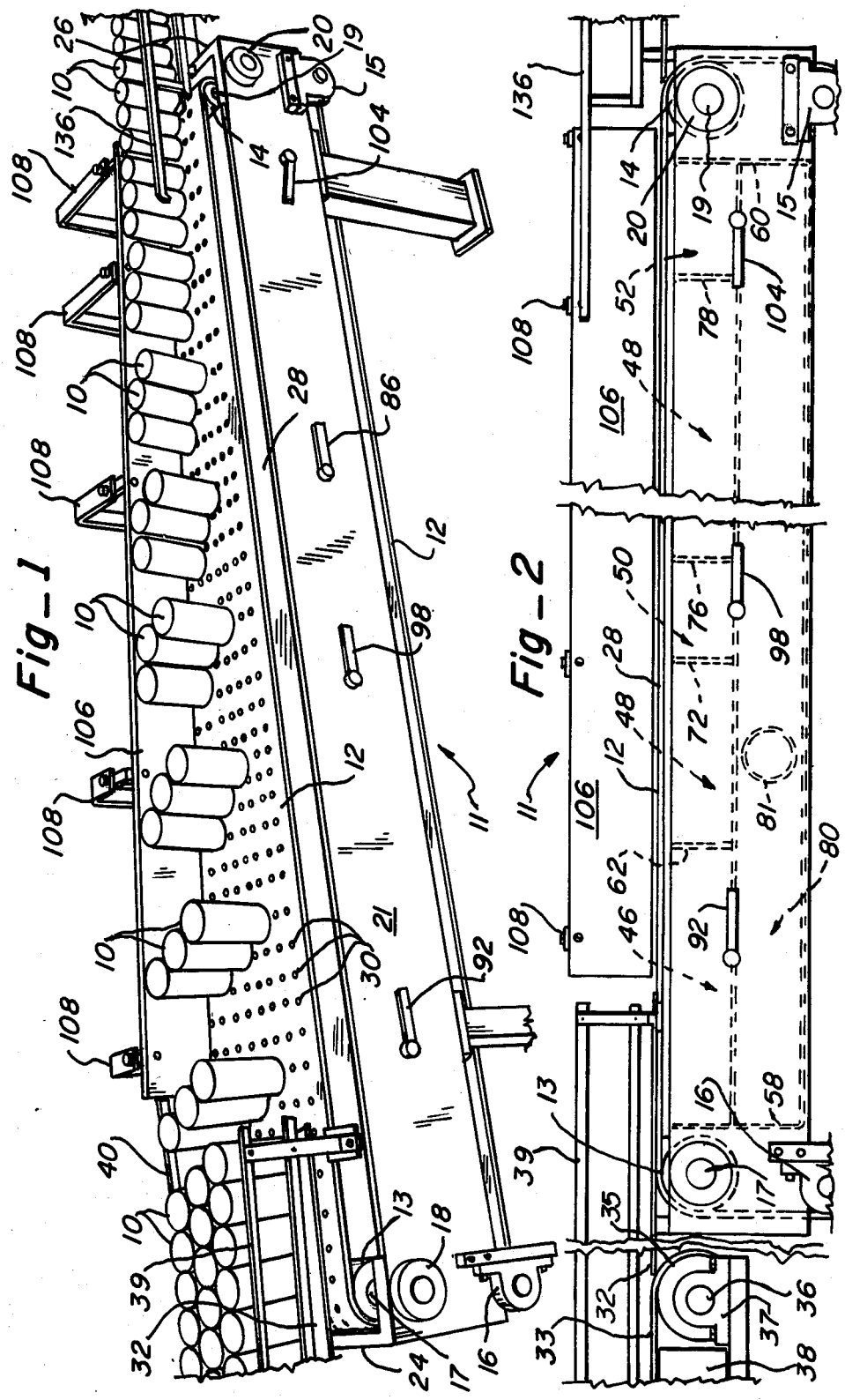

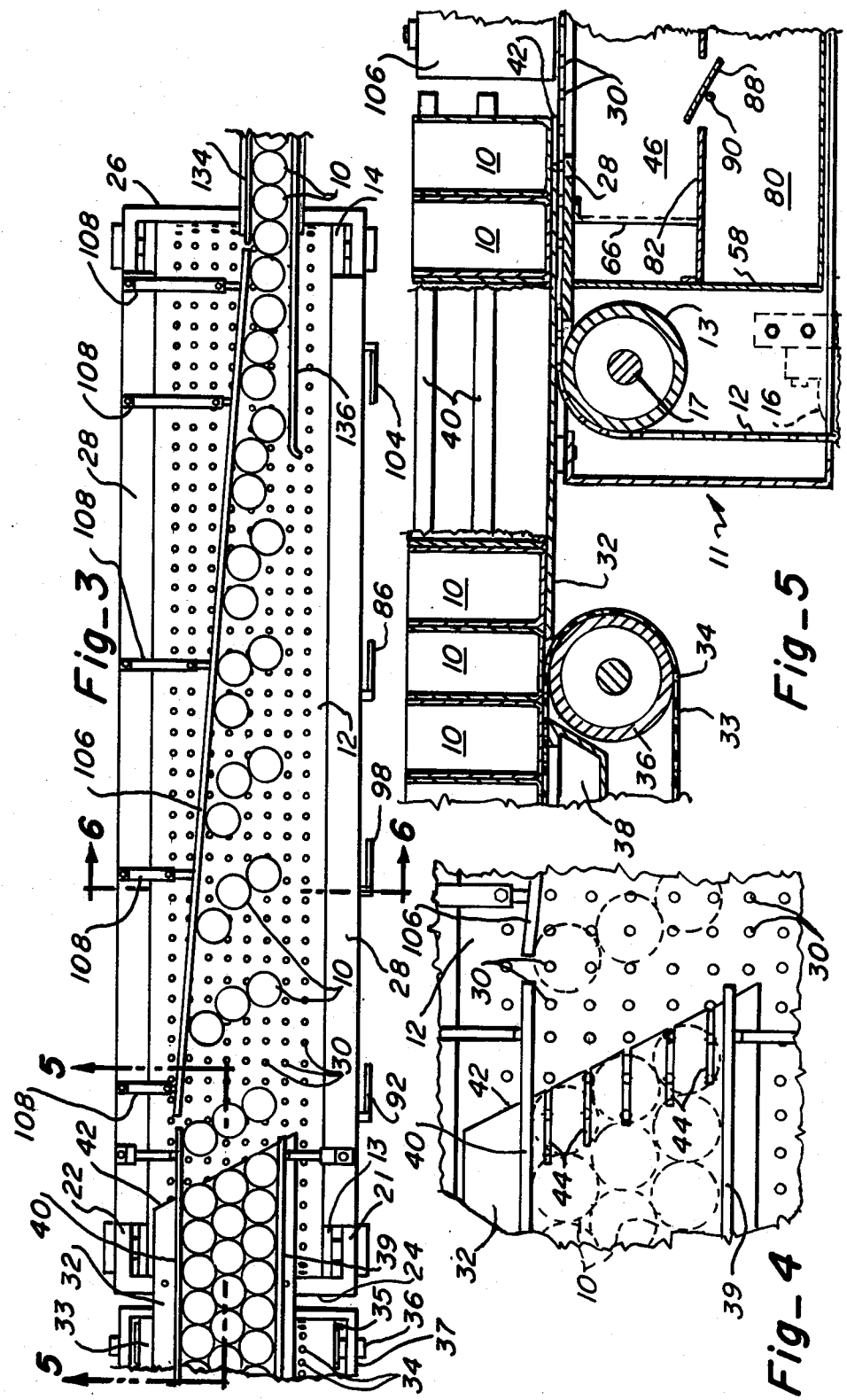

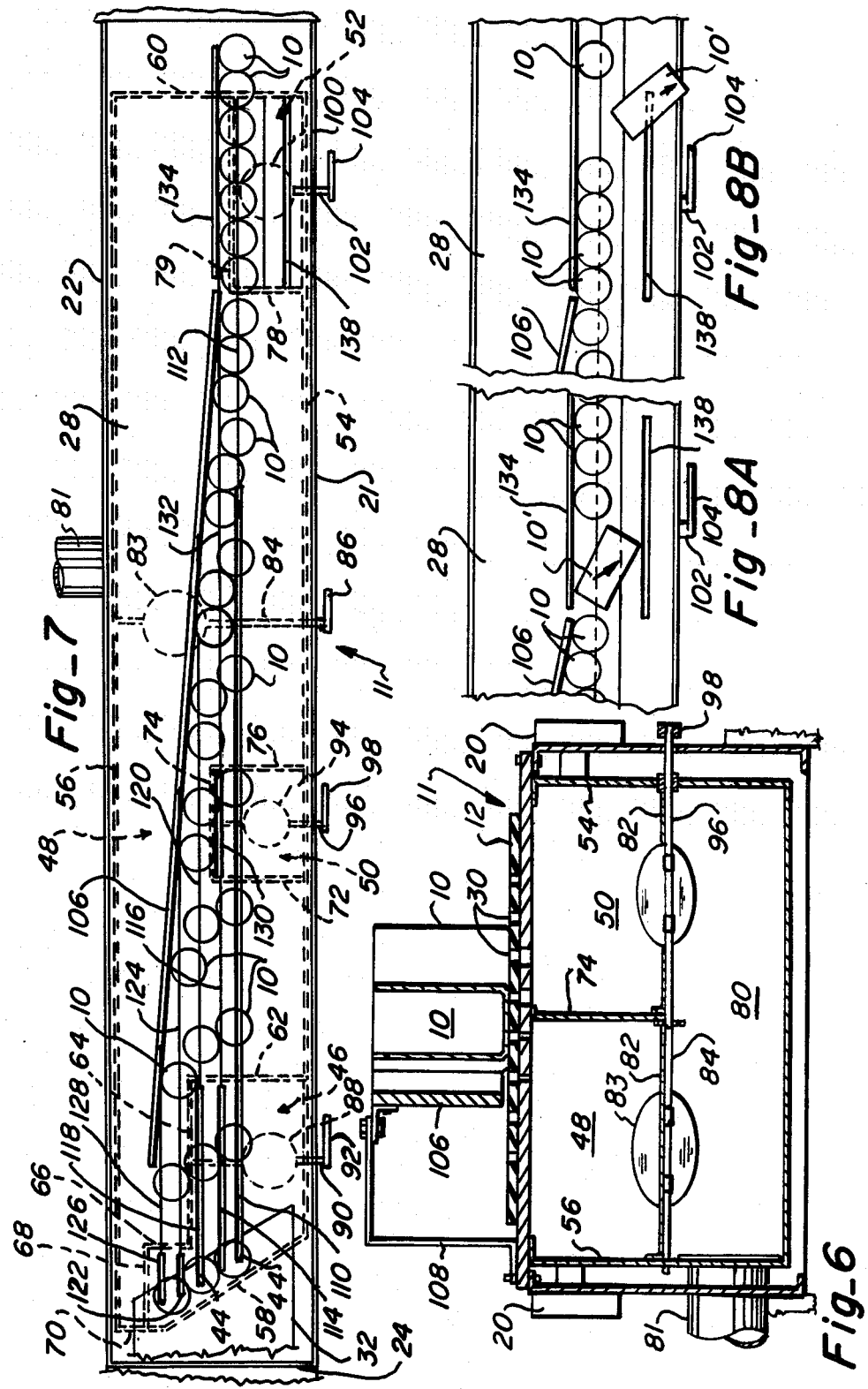

VACUUM SINGLE FILER

FIELD OF THE INVENTION

This invention relates to a device for bringing multiple rows of articles, such as containers, into single file, and more particularly to a device utilizing a vacuum belt which cooperates with a deflector for this purpose.

BACKGROUND ART

Various prior art devices have been devised for bringing containers which are in a bulk or multiple row arrangement into single row alignment. However, these have inherently had certain disadvantages. Devices have been provided wherein multiple rows of containers are moved downstream on a conveyor belt and diagonal deflectors extend inwardly from both sides to funnel the containers into single file arrangement at the downstream end. Such a device is illustrated in U.S. Pat. No. 1,990,549 to Kimball. These devices have an inherent disadvantage in that the containers tend to bridge across the space between the deflectors and can create a jam resulting in the discontinuance of the flow of containers in a single file alignment at the downstream end. Also, such conveyors will only operate satisfactorily at relatively slow speeds, such as under 500 containers per minute.

Roller type conveyors have been provided for conveying multiple rows of containers which are brought into single file by a deflector which extends downstream and diagonally across the conveyor to one side thereof to ultimately bring the containers into single file alignment. Again, such devices must be operated at relatively low speeds. Examples of such devices are shown in U.S. Pat. No. 2,468,290 to Carter and U.S. Pat. No. 2,690,251 to Carter.

A vacuum belt device is illustrated in U.S. Pat. No. 3,352,404 to bring bottles which are dropped down onto the conveyor into longitudinal alignment. This device, however, is not used for bringing multiple rows of containers into single file.

U.S. Pat. No. 4,146,467 to Sauer, et al. discloses a vacuum conveyor for separating misaligned or damaged containers, but has no utility in bringing multiple rows of containers into single file.

A high speed vertical single filer is shown in applicant's U.S. Pat. No. 4,561,806. This device is very efficient and effective for bringing multiple rows of containers into single file at high speed such as 3,500 containers per minute or more. Opposite side walls converge and acceleration jets are provided which coact to bring containers into single file alignment as they move from the upstream end to the downstream end. However, one disadvantage is that a relatively long longitudinal path is required in order to accomplish the single filing. Because of the physical constraints presented in some plants, there is not sufficient distance between adjacent stations so that containers can be brought into single file utilizing this vertical single filer. Furthermore, it cannot be used with containers having high frictional surfaces, such as bright containers. Otherwise, jamming will occur at the point of the equilateral triangle formed by the converging containers because of opposite container rotation.

DISCLOSURE OF THE INVENTION

In accordance with this invention, a vacuum single filer for the transport of articles in a wide mass at an upstream location into single file at a downstream location is provided. The single filer includes means for arranging the mass into discrete rows of articles across the single filer with the article at the outside end of each row longitudinally aligned with a single file downstream location. Means are provided for moving the discrete rows of articles from the upstream location toward the downstream location. Vacuum means are also provided for holding the outside article in fixed lateral position as it is moved from the upstream location to the downstream location while cooperative means move the articles in each interior row into single file alignment behind the outside article as the articles are moved from the upstream location to the downstream location.

More particularly, the single filer includes a foraminous belt having a reach with a center line, extending from an upstream location to a downstream location and having first and second side edges. Means are provided for moving the belt from the upstream location to the downstream location. Means are also provided for supplying articles to the belt at the upstream location in a wide mass. A vacuum plenum extends below the reach of the belt and has an upper wall with openings therein to draw a vacuum through the belt. Means are provided for drawing the vacuum in the plenum and a guide extends above the belt at an angle thereto from a point adjacent the first side of the belt at the upstream location to a point spaced from the second side of the belt a distance slightly greater than the diameter of the article to form a single file discharge for the articles at the downstream location along an axis parallel to the center line. Means are provided which draw a greater vacuum through the belt along the axis passing through the single file discharge to hold the articles aligned with the discharge in position to pass therethrough. The openings in the plenum wall are longitudinal slots which vary in width depending on the amount of vacuum to be drawn and correspond in lateral arrangement with rows of perforations or holes in the foraminous belt. At the upstream end, a dead plate is provided having a diagonal downstream edge with slots therein for drawing a vacuum on the aligned rows of articles over the dead plate to hold them in alignment in diagonal rows. They are moved in this alignment downstream by the mass of articles behind them. As the rows of articles moves onto the foraminous belt, it separates them into discrete rows wherein the articles in each row can be moved laterally so as to be brought into longitudinal alignment along the center line.

A most important feature is an infeed vacuum belt which moves the mass of articles onto the vacuum dead plate when handling articles with high friction surfaces. The articles have to be in a tight equilateral triangle on this infeed vacuum belt and rotation cannot occur or articles will bridge across the dead plate and jam. The infeed vacuum belt holds the articles firmly in place and will not allow the two outside articles to start to rotate which would normally occur because of friction contact with the two outside guide rails.

Slots are provided in the leading edge of the dead plate through which vacuum is drawn to firmly hold the articles in diagonal rows until they are pushed off of the vacuum dead plate onto the vacuum belt. If it were not for the slots in the vacuum dead plate the air being pulled into the vacuum belt would draft the articles off of the dead plate by the Coanda Effect and the articles would feed onto the vacuum belt in a random helter-skelter fashion which would totally disrupt the single filing process.

It can be seen that this device is simple in construction yet is highly efficient in operation and provides a means for aligning a mass of containers into single file at high speed and over a relatively short distance.

The vacuum single filer will handle articles such as freshly washed, highly etched aluminum containers which have an extremely high coefficient of friction since opposing rotation cannot occur.

Articles of the same diameter do not require adjustment of the single filer for different heights, which is the case of all present mechanical or air single filers which are handling articles having a high coefficient of friction.

Additional advantages of this invention will become apparent from the description which follows, taken in conjunction with the accompanying drawings.

BRIEF DESCRIPTION OF THE DRAWINGS

FIG. 1 is a perspective view of the vacuum single filer of this invention;

FIG. 2 is a fragmentary, side elevation of the apparatus of FIG. 1, with the containers omitted for clarity of illustration;

FIG. 3 is a top plan view of the apparatus of FIG. 1, showing further details thereof;

FIG. 4 is an enlarged, fragmentary, plan view of the dead plate showing the position of the containers as they move thereacross onto the perforated belt;

FIG. 5 is an enlarged, vertical, fragmentary section, taken along line 5—5 of FIG. 3, showing the arrangement of the drive belts at the dead plate area;

FIG. 6 is a vertical section, taken along line 6—6 of FIG. 3, showing details of the vacuum plenums;

FIG. 7 is a top plan view, similar to FIG. 3, but omitting the belt and rails to show the arrangement of the vacuum slots and location of the various plenums;

FIG. 8A is a fragmentary, top plan view at the downstream end of the single filer showing a downed container as it is being drafted away from the other containers; and FIG. 8B is a fragmentary, top plan view similar to FIG. 8A, but showing the drafted container as it is discharged from the apparatus.

BEST MODE FOR CARRYING OUT THE INVENTION

In accordance with this invention, a vacuum single filer is provided wherein a mass of articles, such as containers 10 can be brought into single file alignment as very high speeds. By way of a general description, the apparatus includes a vacuum plenum table 11 having an endless transfer belt 12 which extends around an upstream idler roller 13 and a downstream drive roller 14 for conveying containers from the upstream location to the downstream location to bring them from a multirow alignment into single file, as more fully described below. The downstream end of belt 12 passes around a lower downstream roller (not shown) which is journaled in bearings 15. Belt 12 extends along the bottom of table 11 to a lower upstream roller (not shown), which is journaled in bearings 16, and back to roller 13. Conveniently, roller 13 is mounted on shaft 17 which is journaled in bearings, such as bearing 18. Similarly, roller 14 is mounted on shaft 19 which is journaled in bearing 20. Table 11 has spaced side walls 21 and 22 which are interconnected by an upstream end wall 24 and a downstream end wall 26. Within this table are several plenums which are individually controlled and are described more fully below. Over the top of the table and the plenums is a plenum top wall or slotted board 28 through which air is drawn by the vacuum from the various plenums. Conveniently, endless belt 12 has a plurality of rows of perforations or holes 30 which are aligned with selective slots in board 28 to facilitate the single file alignment of the containers, all as discussed below.

Advantageously, containers 10 are supplied onto a dead plate 32 by suitable infeed vacuum conveyor means, such as conveyor belt 33, having perforations 34, best seen in FIG. 2, which extends over drive roller 35. The drive roller 35 is mounted on shaft 36 journaled in bearing 37. The vacuum is drawn through vacuum plenum 38 mounted below belt 33. The containers are supplied from vacuum conveyor belt 33 to dead plate 32 between a pair of spaced side rails 39 and 40. The rails can be tapered along the portion thereof above belt 33 to bring the containers into tight contiguous rows of three or more which are nested together in their normal equilateral triangular configuration forming rows of three or more containers each at an angle of 30° to a line perpendicular to the direction of movement, all as best seen in FIGS. 1 and 3. The vacuum drawn through conveyor belt 33 serves to lock the containers in the tight equilateral configuration so that they remain indexed or aligned so that each row of containers has exactly the same alignment and will be discharged from the dead plate in exactly the same orientation with respect to each other.

As seen in FIGS. 3 and 4, dead plate 32 has a leading edge 42 which is at a corresponding 30° angle and has a plurality of parallel longitudinal slots 44 extending inwardly from the leading edge and which correspond in positioning with the rows of openings 30 in belt 12. As a vacuum is drawn in the plenum below openings 30, the row of containers which is adjacent the leading edge of dead plate 32 above slots 44 will be firmly held on the edge of the plate and remains there until they are pushed off of the dead plate by adjacent rows of containers being moved forwardly by vacuum belt 33. This assures that the containers are uniformly arranged in diagonal rows of three or more as they leave the dead plate and move onto belt 12. The spacing between adjacent diagonal rows of containers will be determined by the speed relative between belt 12 and belt 33 and can be adjusted as required to bring the containers into a continuous single row file. The faster the speed of belt 12 relative to the speed of belt 33, the greater the spacing between diagonal rows of containers.

Referring now to FIG. 7, it can be seen that plenum top wall 28 includes a plurality of longitudinal slots which vary in length and width and are utilized to draw a vacuum on the bottom of the respective containers and to provide for variations in the vacuum due to the different vacuum chambers or plenum chambers over which the slots pass. An upstream vacuum chamber 46 is provided adjacent to and below dead plate 32. A large main vacuum chamber 48 is adjacent to and substantially downstream of vacuum chamber 46 and includes most of the area under top wall 28. Within main vacuum chamber 48 is a small intermediate vacuum chamber 50 and adjacent the downstream end of main vacuum chamber 48 is another small downstream vacuum chamber 52.

The vacuum chambers are encompassed by longitudinal side walls 54 and 56 which are interconnected by angular upstream end wall 58, which is parallel to the downstream edge of dead plate 32, and lateral downstream end wall 60.

Vacuum chamber 46 is defined further by a lateral side wall 62 which extends inwardly from outer side wall 54 and joins longitudinal wall 64 which is perpendicular thereto and extends upstream until it joins a short lateral side wall 66 which joins another longitudinal side wall 68 that extends upstream until it connects with a lateral portion 70 of diagonal side wall 58.

Within the outer dimensions of plenum chamber 48 are two smaller plenum chambers, namely an intermediate chamber 50 and a downstream plenum chamber 52. Plenum chamber 50 includes a lateral upstream wall 72 which extends inwardly from outer side wall 54 and connects to longitudinal wall 74 which in turn is connected to lateral downstream wall 76. Downstream plenum chamber 52 has an upstream lateral wall 78 which extends inwardly and connects to a longitudinal wall 79 which in turn connects to end wall 60.

Each of the above-described plenum chambers communicates with a lower master vacuum plenum 80 having vacuum drawn therein through duct 81 connected to a blower (not shown) as best seen in FIGS. 2 and 6, plenum 80 extends under all of the other plenums and is bounded by side walls 54 and 56 and end walls 58 and 60. A top wall 82 separates lower chamber 80 from the other plenum chambers. The vacuum in main plenum chamber 48 is controlled by means of valve 83 between main chamber 48 and lower chamber 80, which is operated through control rod 84 connected to handle 86. The upstream plenum chamber 46 has a valve 88, for communication with lower plenum chamber 80, operated through a control rod 90 connected to handle 92. Likewise, plenum chamber 50 has the vacuum controlled between it and chamber 80 by means of valve 94 connected through arm 96 to handle 98. Similarly, vacuum plenum 52 has the vacuum controlled between it and chamber 80 through valve 100 which is connected by means of arm 102 to handle 104.

A deflector 106 extends diagonally across a portion of belt 12 from an upstream end to a downstream end and serves to move the containers from their multi-row alignment into single file across the vacuum belt, as will be discussed in more detail below. Conveniently, deflector 106 is supported by a plurality of adjustable brackets 108 which permit adjustment of the angle of deflection of the cans so that the deflector 106 may be straight or curved, if desired as conditions dictate. The upstream end is located to be engaged by the innermost container of each diagonal row. The downstream end is located to bring the containers into final single file alignment in cooperation with varying amounts of vacuum drawn on the respective containers of each diagonal row.

A very long and relatively wide slot 110 extends from under a slot 44 of dead plate 32 downstream to a point wherein the containers are nearly in single file whereupon it necks down to a narrower slot 112 which extends downstream through the single file zone. As can be seen, the containers which are aligned with slot 110 at dead plate 32 remain aligned with this slot and continuing slot 112 through the single file zone at the downstream end.

Adjacent slot 110 is an equally wide, but much shorter slot 114 whose upstream end also begins under one of slots 44 of dead plate 32, but extends downstream to a point just adjacent the wall 62 between upstream plenum chamber 46 and main plenum chamber 48. The downstream end of slot 114 terminates in a narrower slot 116 which extends downstream through the single file zone. Similarly, another relatively short but wide slot 118 has an upstream end extending from beneath a slot 44 in dead plate 32 to a downstream location adjacent wall 62 and merges with a narrower slot 120 extending downstream to a position under deflector 106. Another wide but even shorter slot 122 extends from a position under another slot 44 in deadplate 32 downstream to a point adjacent lateral plenum wall 66 whereupon it merges with narrow slot 124 extending to a point under deflector 106. Finally, another short wide slot 126 extends from under another slot 44 in deadplate 32 downstream to a point adjacent lateral plenum wall 66 whereupon it merges with narrow slot 128 extending to a point under deflector 106. It will be understood that the lateral spacing of all of the previously described slots is less than one container diameter so that during the lateral movement, each container will be over at least one slot for holding it against the belt.

Each of the plenum chambers can be connected to a source of vacuum, such as an exhaust fan (not shown) which communicates to the various chambers by means of suitable ducts (not shown). For example, plenum chamber 46 is connected to the vacuum source through a valve 88 through which the flow of air can be adjusted, as by handle 92. A high vacuum is pulled through upstream plenum chamber 46 and therefore through slots 110, 114, 118, 122 and 126. Conveniently, each of these slots extends under slots 44 of dead plate 32, as previously described, and therefore firmly holds the leading row of containers so they are in precise angular alignment. They remain in that position until pushed forwardly by the mass of containers being advanced thereacross by belt 33. The high vacuum in this area stabilizes the containers so that they don't fall over as they move from the dead plate onto the belt and are brought up to the speed of the belt. However, after the containers leave the dead plate and are advanced by endless belt 12, the inner most container will cross plenum wall 66 and then will be above narrower slots 124 and 128 which are extensions of wider slots 122 and 126, respectively, so that this container is subjected to less vacuum force as it advances with belt 12. On the other hand, the outer containers will be under wide slots 110, 114 and 118 during this initial downstream movement. Thus, as the innermost container engages deflector 106 it will tend to be drug to the rear of the other two containers. The containers will then be over the main plenum chamber 48.

As the containers move past lateral wall 62, which separates plenum chambers 46 and 48, the slots 114 and 118 are reduced in width and merge with narrow slots 116 and 120, as previously described. Thus, the vacuum drawn on the center container is reduced, but since the outer container is still above wide slot 110, a substantial vacuum is still drawn thereon. As the containers move further downstream, the outside container moves over plenum chamber 50 whereupon narrow slot 116 increases in width to become a wide slot 130 thereby applying further vacuum on the outside container. This is necessary because by the time the containers reach this position the center container comes into engagement with deflector 106 and begins to be drug rearwardly with respect to the outside container. Thus, it is important to hold the outside container in its aligned position with respect to the single file discharge against any frictional or lateral forces applied to it by the movement of the center container.

As the containers are carried downstream past plenum chamber 50 and back over plenum chamber 48, the two inside containers are now almost in single file but displaced inwardly and rearwardly from the outside container which continues along its original path. Slot 130 necks down to a narrow slot 132 which continues through the single file zone.

As containers continue further downstream, deflector 106 continues to push the inner containers outwardly so that they ultimately become aligned with the outside container. As the downstream end is approached, the wide slot 110 which is under the outside containers narrows down to a narrow slot 112 because at this point the inner containers are nearly aligned with the outer container and the additional vacuum force is no longer required. By reducing the size of the slots, the power requirements for the apparatus are also reduced very substantially. It will be understood that the vacuum force applied by the narrower slots, previously described, is of a low enough force that the deflector 106 can move or slide the cans laterally across the belt as the belt advances the containers, whereas the vacuum force under the wide slots is sufficient to substantially lock the container thereover in a fixed position relative to belt 12 as the other cans are moved laterally by the deflector 106. When the containers come into single file arrangement, they are parallel with guide 134 and are held in alignment by that guide and an opposite parallel guide 136, as best seen in FIGS. 1 and 3.

Adjacent the single file area, and spaced laterally outwardly from the path of the cans is a wide longitudinal drafting slot 138 of limited length. The purpose of this slot is to draft a downed container 10' away from the single file path and over the edge of vacuum plenum table 11 to a suitable receptacle (not shown) so that the container does not continue along the single file path with the properly oriented containers. The vacuum drawn through slot 138 will cause a downed container to be drawn toward the slot and because of the momentum of the container it will continue rolling across the slot and off the edge of the table into the receptacle. Conveniently, guide 136 comprises a single rail spaced above the belt a sufficient distance to allow a downed container 10' to roll thereunder.

From the foregoing, the advantages of this invention are readily apparent. A vacuum single filing device has been provided which will bring containers into single file at very high speeds wherein diagonal rows of three or more containers are sequentially discharged onto a vacuum conveyor belt with the outside container being held in fixed position by vacuum while a deflector moves the inner containers gradually into alignment behind the outside container ultimately bringing the containers into single file. Furthermore, this can be accomplished over a relatively short distance as compared to other single filers presently available. Another important advantage is that the single filer of this invention can be used to single file highly etched aluminum containers of any height which have surfaces with a high coefficient of friction.

The invention has been illustrated and described in conjunction with single filing apparatus wherein the containers are supported and conveyed by a belt under the containers. However, it should be understood that the single filing apparatus could be above the containers whereupon they are lifted and conveyed by means of the vacuum from the upstream position, wherein they are in mass, to the downstream single file zone in accordance with the teaching of my above-mentioned U.S. patent application Ser. No. 533,225.

Although the articles have been described as being empty cylindrical containers, they can be of any cross-sectional geometry, such as oval or rectangular. The sidewalls do not have to be straight, but can be contoured. The containers can be either full or empty and can be of any height. The container weight is merely a function of the degree of vacuum that is pulled at the vacuum transfer belt to get the container up to speed without tipping over.

This invention has been described in detail with reference to a particular embodiment thereof, but it will be understood that various other modifications can be effected within the spirit and scope of this invention.

I claim:

1. A vacuum single filer for the transport of articles in a wide mass at an upstream location into single file at a downstream location, said single filer comprising:
   means for arranging said mass into diagonal rows of articles across said single filer with an article at the outside end of each row longitudinally aligned with a single file downstream location;
   means for longitudinally separating and moving the diagonal rows of articles from said upstream location toward said downstream location;
   vacuum means for holding the outside article in fixed lateral position as it is moved from said upstream location to said downstream location; and
   means for moving the other articles in each row into alignment behind the outside article as the outside is held in said fixed lateral position and as the other articles are moved from said upstream location to said downstream location.

2. A vacuum single filer for converging articles received in a wide mass at an upstream location to single file at a donwstream location, said single filer comprising:
   a foraminous belt having a reach with an article conveying side and a vacuum side and a centerline, said reach extending from an upstream location to a downstream location and having an inside edge and an outside edge;
   means for moving said belt from said upstream location to said downstream location;
   means for supplying articles to said belt at said upstream location in discrete, diagonal, lateral rows of at least three articles each wherein the outside article is downstream of the other articles in the row;
   vacuum plenum means on the vacuum side of said reach of said belt having a wall adjacent said reach with parallel longitudinal slots therein to draw a vacuum through said belt;
   a deflector extending from said article conveying side of said belt at an angle thereto from a point adjacent said inside edge of said belt at said upstream location to a point spaced from said outside edge of said belt a distance slightly greater than the diameter of the articles to form a single file discharge for the articles at said downstream location along an axis parallel to said centerline; and
   means providing a greater vacuum through said belt along said axis passing through said single file discharge to hold the outside article in each row aligned with said single file discharge and providing a lesser vacuum through said belt to other articles so that they can be slid across said belt by said deflector to bring them into single file alignment along said parallel axis behind the outside article at said single file discharge.

3. Apparatus, as claimed in claim 2, wherein:
said belt moving means moves said belt at sufficient speed to longitudinally separate said rows of articles along said belt so that each succeeding row of articles can be brought into alignment with the preceeding articles.

4. Apparatus, as claimed in claim 2, wherein:
one of said longitudinal plenum wall slots is located along said axis and is wider than said other slots to act as said greater vacuum providing means.

5. Apparatus, as claimed in claim 2, wherein:
said plenum wall extends laterally beyond said outside edge of said belt and has a slot parallel to and spaced from said outside belt edge to draft tipped articles off of said belt.

6. Apparatus, as claimed in claim 2, wherein said article supplying means includes:
a dead plate at said upstream location across said article conveying side of said reach of said belt and having a leading diagonal edge to laterally align said articles in diagonal rows as they move onto said belt.

7. Apparatus, as claimed in claim 6, wherein said article supplying means further includes:
a perforated infeed belt for supplying said articles to said dead plate;
guide means for containing said mass of articles in an equilateral triangular configuration; and
means for drawing a vacuum through said infeed belt to hold said articles in fixed relation to each other and against frictional forces applied by said guide means on said articles.

8. Apparatus, as claimed in claim 2, wherein said vacuum plenum means comprises:
a plurality of plenum chambers adjacent said vacuum side of said belt reach to draw varying amounts of vacuum along the length of said reach to selectively control the movement of the articles laterally across the belt.

9. Apparatus, as claimed in claim 6, including:
at least one longitudinal plenum slot through which a vacuum is drawn in said plenum chambers to hold each article of each row on said reach, said slots having at least a relatively wide portion at the upstream end adjacent said dead plate and a narrower downstream portion.

10. Apparatus, as claimed in claim 9, wherein:
said dead plate has a plurality of slots aligned with and overlapping the upstream ends of said longitudinal plenum slots.

11. Apparatus, as claimed in claim 6, said vacuum plenum means includes:
an upstream plenum chamber for drawing a vacuum through said dead plate slots and at least a portion of the wide upstream portion of said longitudinal plenum slots; and
a main plenum chamber for drawing a vacuum through at least a large portion of the remainder of said plenum slots along their respective lengths.

12. Apparatus, as claimed in claim 11, wherein said vacuum plenum means further includes:
an intermediate plenum chamber within said main plenum chamber to draw a greater vacuum on articles moving along said axis to hold them in lateral fixed position on said belt as adjacent containers are slid laterally across said belt into alignment along said axis by said deflector.

13. Apparatus, as claimed in claim 5, wherein said vacuum plenum means further includes:
a downstream plenum chamber at said single file discharge communicating with said parallel slot to draft tipped articles off of said belt.

14. A vacuum single filer for conveying vertically arranged cylindrical articles received in a wide mass at an upstream location to single file at a downstream location, said single filer comprising:
a foraminous belt having a reach, with a centerline, said reach extending from an upstream location to a downstream location and having an inside edge and an outside edge;
means for moving said belt from said upstream location to said downstream location;
means supplying articles to said belt at said upstream location in a wide mass;
a guide extending above said belt at an angle thereto from a point adjacent said inside edge of said belt at said upstream location to a point spaced from said outside edge of said belt a distance slightly greater than the diameter of the articles to form a single file discharge for the article at said downstream location along an axis parallel to said centerline;
a vacuum plenum means below said reach of said belt having an upper wall supporting said reach between said upstream location and said downstream location;
means for drawing different amounts of vacuum in different portions of said plenum means, and;
a plurality of parallel longitudinal slots in said plenum wall for drawing a different amount of vacuum on laterally spaced articles on said belt to move them with said belt from said upstream location to said downstream location but permitting the articles furtherest from said outside edge to be slid across said belt by said guide.

15. Apparatus, as claimed in claim 14, further including:
a dead plate at the upstream end of said belt having a leading diagonal edge with longitudinal slots extending upstream therefrom and aligned with said longitudinal plenum slots to laterally align and hold said articles in diagonal rows on said dead plate before they are pushed onto said belt by the mass of upstream articles.

16. Apparatus, as claimed in claim 15, wherein said longitudinal plenum slots include:
a first slot adjacent said inside edge of said belt having a wide upstream portion extending from under a first dead plate slot and extending a first short distance downstream therefrom and terminating in a narrow portion extending to said guide;
a second slot adjacent said first slot and spaced toward said outside edge of said belt having a wide upstream portion extending from under a second dead plate slot and extending said first short distance downstream therefrom and terminating in a narrow portion extending to said guide;
a third slot adjacent said second slot and spaced toward said outside edge of said belt having a wide upstream portion extending from under a third dead plate slot and extending a second distance downstream which is greater than said first distance and terminating in a narrow portion extending downstream to said guide;

a fourth slot adjacent said third slot and spaced toward said outside edge of said belt having a wide upstream portion extending from under a fourth dead plate slot said second distance downstream and terminating in a narrow portion extending downstream toward said guide; and a fifth slot adjacent said fourth slot and spaced toward said outside edge of said belt having a wide upstream portion extending from under a fifth dead plate slot a third distance downstream which is substantially greater than said second distance and terminating in a narrow portion extending downstream through said downstream location.

17. Apparatus, as claimed in claim 16, wherein said fourth slot further includes:

alternate wide and narrow portions from said dead plate downstream to said guide.

18. Apparatus, as claimed in claim 17, wherein said vacuum drawing means includes:

means for varying the vacuum drawn at different portions of said longitudinal slots in cooperation with the position of articles along said belt reach and their arrangement with respect to said guide.

19. A vacuum single filer for the transport of articles in a wide mass at an upstream location into single file at a downstream location, said single filer comprising:

infeed means for arranging a mass of incoming articles into a contiguous equilateral triangular configuration at said upstream location;

infeed perforated conveyor for supplying the articles from said upstream location toward said downstream location;

means drawing a vacuum through said infeed conveyor to hold said articles in said contiguous configuration;

a foraminous vacuum transfer belt adjacent to and downstream of said infeed conveyor;

means for drawing a vacuum through said transfer belt; and a dead plate bridging said infeed conveyor and said transfer belt, said dead plate having a leading diagonal edge which extends over said transfer belt and has openings through which said vacuum in said transfer belt is drawn to hold the articles as they reach said leading edge in alignment along said edge for movement in diagonal rows onto said transfer belt.

20. A vacuum single filer as claimed in claim 19, wherein said infeed means includes:

a pair of spaced rails which converge at said upstream location to hold the articles in said contiguous alignment.

21. A vacuum single filer, as claimed in claim 19, wherein said opening in said dead plate comprises:

slots spaced across said diagonal edge and extending upstream therefrom.

22. A vacuum single filer, as claimed in claim 19, further including:

diagonal guide means extending from the upstream end of said transfer belt to the downstream end thereof for bringing the diagonal rows of articles into single file alignment at said downstream location.

23. A method of conveying a wide mass of articles at an upstream location into single file at a downstream location, said method including the steps of:

arranging the mass of articles into discrete diagonal rows of three articles each;

separating the diagonal rows of articles:

moving said separate diagonal rows of articles downstream and from the mass;

laterally moving two of the articles into alignment with the third article in each row as the row is moved from the upstream location to the downstream location; and holding the third article in fixed lateral position by means of vacuum as the other articles are moved into single file behind the third article.

* * * * *